United States Patent [19]

Whalen-Shaw

[11] Patent Number: 5,454,864
[45] Date of Patent: Oct. 3, 1995

[54] LAYERED COMPOSITE PIGMENTS AND METHODS OF MAKING SAME

[76] Inventor: Michael Whalen-Shaw, 7041 Zane Trail Rd., Circleville, Ohio 43113

[21] Appl. No.: 261,390

[22] Filed: Jun. 17, 1994

Related U.S. Application Data

[63] Continuation-in-part of Ser. No. 834,468, Feb. 12, 1992, Pat. No. 5,344,487.

[51] Int. Cl.$^6$ ............................................. C04B 14/10
[52] U.S. Cl. ..................... 106/416; 106/208; 106/437; 106/442; 106/446; 162/135; 162/162; 162/181.8; 428/403; 428/407; 501/141; 501/144; 501/148; 523/400
[58] Field of Search ................... 106/416, 20 R, 106/437, 442, 446; 162/162, 181.8, 135; 501/141, 144, 148; 523/400; 428/403, 407

[56] References Cited

U.S. PATENT DOCUMENTS

| | | | |
|---|---|---|---|
| 2,176,877 | 10/1939 | Alessandroni | 106/423 |
| 2,949,397 | 8/1960 | Werner et al. | 106/465 |
| 5,152,835 | 10/1992 | Nemeh | 106/437 |
| 5,169,441 | 12/1992 | Lauzon | 106/465 |

FOREIGN PATENT DOCUMENTS

93/12184  6/1993  European Pat. Off. .

OTHER PUBLICATIONS

"Preparation of Composite Fine Particles By Heterocoagulation" Furusawa and Anzai, Colloid and Polymer Science, vol. 265 No. 10, pp. 882–888, 1987.

*Primary Examiner*—Mark L. Bell
*Assistant Examiner*—Scott L. Hertzog
*Attorney, Agent, or Firm*—Tarolli, Sundheim & Covell

[57] ABSTRACT

The present invention resides in a layered composite pigment comprising a first pigment particle having a charge of one sign and a second pigment particle having a charge of opposite sign to said one sign. The first pigment particle is an inorganic pigment particle. The first inorganic pigment particle has adsorbed on its surface an organic polymeric dispersant. The dispersant is selected from the group consisting of (a) an anionic or cationic polyelectrolyte dispersant; (b) a cationic synthetic latex having dispersant functionality; and (c) a cationic water-soluble binder having dispersant functionality. The dispersant is adsorbed onto the surface of the inorganic pigment particle in an amount effective to disperse the inorganic particle in an aqueous medium. The second pigment particle is selected from the group consisting of (a') an anionic or cationic synthetic latex particle or swollen binder particle which said swollen binder particle has a particle size greater than 0.05 micron; and (b') a second inorganic pigment particle which has adsorbed on its surface an anionic polyelectrolyte dispersant in an amount effective to disperse the second inorganic particle in an aqueous medium. The layered composite pigment comprises the combination of (a') with an inorganic pigment particle dispersed with (a), (b) or (c); or (b') with an inorganic pigment particle dispersed with only (b) or (c).

29 Claims, No Drawings

LAYERED COMPOSITE PIGMENTS AND METHODS OF MAKING SAME

RELATED APPLICATION

This is a continuation-in-part of prior application Ser. No. 834,468, filed Feb. 12, 1992 now U.S. Pat. No. 5,344,487.

TECHNICAL FIELD

The present invention relates to a layered composite pigment. The layered composite pigment is particularly useful in a paper coating. The layered composite pigment is also useful as a paper filling, and in paint, ink, rubber, and plastic compositions.

The present invention also relates to a process for the production of the layered composite pigment.

The present invention further relates to a layered composite pigment in which one of the pigment particles is dispersed and the dispersant is a cationic latex binder or water soluble cationic binder having dispersant functionality as well as binder functionality.

DESCRIPTION OF THE PRIOR ART

Structured or high-bulking pigments have been shown to offer improvements in optical and printing properties when used as a partial or total substitution for clay and paper coatings. The improved optical and printing properties are provided by their increased bulk, improved coating coverage over a substrate, and lower coating weight.

However, some products exhibit either poor rheology or lack of stability in standard paper coating procedures. A rheology appropriate to blade coating speed in excess of 4,000 feet per minute is desirable. Additionally structured pigments must survive the shear conditions encountered in coating preparation and use, such as jet cooking, pigment dispersion, and pumping and blade metering.

Binders are used in coating formulations to adhere the pigment to the substrate. The binders also serve other functions. Examples of binders are solution binders such as starch, protein, casein, and polyvinyl alcohol, and emulsion or latex binders such as styrene-butadiene latex. The migration of binders during the application, metering, and drying of paper coatings is well known. Such migration leads to uneven ink density in printing and also can result in localized areas of zero or low binder concentration within the thickness of a coating. This can lead to wet pick during printing.

U.S. Pat. No. 2,176,877 discloses a process for the manufacture of a composite pigment. A primary pigment is dispersed in an aqueous suspension using a first dispersing agent. Separately, a secondary pigment is dispersed in an aqueous suspension using a second dispersing agent. The second dispersing agent is antipathetic to the first dispersing agent. By antipathetic, it is meant that the second dispersing agent is capable of furnishing ions, on admixture of the primary pigment and secondary pigment, which neutralize the dispersing ions of the first dispersing agent. The dispersing agents are all salts, such as aluminum chloride and sodium silicate.

One example given in this patent is coflocculation obtained by admixing a suspension of titanium dioxide, prepared by means of the acidic salt, aluminum chloride, with a suspension of barium sulfate prepared with the basic substance, sodium silicate. Examples of other acidic dispersants given in the patent are hydrogen sulfide and lead chloride. Following coflocculation, the composite pigment is then separated from the supernatant liquid, washed, dried and pulverized.

U.S. Pat. No. 5,152,835 discloses composite pigments comprising particles of titania and particles of calcined kaolin mixed and adhered together into unitary particles by means of a cationic polyelectrolyte. In the Examples in the patent, a slurry of the two pigments is formed and the cationic polyelectrolyte is then added to the slurry. It is indicated in the patent that the cationic polyelectrolyte can be added separately to one of the components. The patent contains the speculation that the cationic polyelectrolyte reacts with opposite charge sites on the pigment particles as well as an anionic dispersant, reducing the negative charge on the pigment particles which in turn leads to coalescence by opposite charge attraction.

Preparing a composite pigment of a latex and a pigment particle is disclosed in the publication "Preparation of Composite Fine Particles By Heterocoagulation", Furusawa and Anzai, Colloid and Polymer Science, Vol. 265, No. 10, pages 882–888, 1987. Furusawa et al. report that an amphoteric latex can absorb on the surface of a silica particle. However, they found that high particle number ratios (latex to silica) of 160 or more are necessary to avoid irregular coagulation and settling.

Such particle number ratios are not useful in paper coatings. Traditionally, 10% latex based on pigment is used. Given an average particle diameter of 0.5 microns, and an average latex particle diameter of 0.15 microns, the particle number ratio should be in the approximate range of about 10 to 30, far less than 160.

Furusawa et al. do not give the reason for the existence of irregular coagulation and settling at low particle number ratios. Settling would be expected with the development of large mass particles or localized flocculation.

SUMMARY OF THE INVENTION

The present invention resides in a layered composite pigment comprising a first pigment particle having a charge of one sign and a second pigment particle having a charge of opposite sign to said one sign. The first pigment particle is an inorganic pigment particle. The first inorganic pigment particle has adsorbed on its surface an organic polymeric dispersant. The dispersant is selected from the group consisting of (a) an anionic or cationic polyelectrolyte dispersant; (b) a cationic synthetic latex having dispersant functionality; and (c) a cationic water-soluble binder having dispersant functionality. The dispersant is adsorbed onto the surface of the inorganic pigment particle in an amount effective to disperse the inorganic particle in an aqueous medium.

The second pigment particle is selected from the group consisting of (a') an anionic or cationic synthetic latex particle or swollen binder particle wherein the swollen binder particle has a particle size greater than 0.05 micron; and (b') a second inorganic pigment particle which has adsorbed on its surface an anionic polyelectrolyte dispersant in an amount effective to disperse the second inorganic particle in an aqueous medium. The layered composite pigment comprises the combination of (a') with an inorganic pigment particle dispersed with (a), (b) or (c); or (b') with an inorganic pigment particle dispersed with only (b) or (c).

In one embodiment, the anionic or cationic synthetic latex particle is a binder particle having a $T_g$ in the range of −30° to 150° C., preferably −20° to 110° C., said latex particle being electrostatically bound to an inorganic pigment particle which has adsorbed on its surface a polymeric dispersant of opposite charge.

In another embodiment, the anionic or cationic synthetic latex particle is a plastic pigment particle which is electrostatically bound to an inorganic pigment particle which has adsorbed on its surface a polymeric dispersant of opposite charge.

Preferred cationic water-soluble binder materials having a dispersant functionality are cationic starch, cationic polyvinyl alcohol, and cationic protein.

The present invention also resides in a water dispersion containing any of the above layered composite pigments.

The present invention also resides in a paper coating composition containing any of the above layered composite pigments.

The present invention also resides in an inorganic pigment particle which has adsorbed on its surface a synthetic latex, wherein said latex is cationic and has a dispersant functionality. The undispersed inorganic pigment particle, when slurried in water, has a zeta potential in the range of +5 to negative, and said latex has a $T_g$ in the range of $-30°$ to $150°$ C., preferably $-20°$ to $110°$ C. The dispersed particle has a zeta potential in the range of +5 to +100 mv.

DESCRIPTION OF PREFERRED EMBODIMENTS

For purposes of the present application, a dispersing agent is defined as a material which reduces the viscosity of a slurry of inorganic particles. A cationic dispersing agent is a material which reduces the viscosity of the slurry of inorganic particles and imparts to the particles a cationic charge. The dispersing agent in the present invention is an organic polymeric material of sufficiently high molecular weight that the dispersing agent becomes adsorbed onto the surface of the inorganic particles and adheres to the surface by electrostatic or Van der Waals forces.

A synthetic latex is defined as a suspension of synthetic organic polymeric particles having an average particle size in the range of 0.01 to 2 microns, preferably in the range of 0.05 micron to 1 micron, in an aqueous medium. The term particle size as used herein means that at least 50% of the particles have at least this dimension in the particle longest dimension.

A binder latex is a synthetic latex having a $T_g$ in the range of $-30°$ to $150°$ C., preferably in the range of $-20°$ to $110°$ C. The term "$T_g$" as used herein means glass transition temperature.

The synthetic latex can also be a plastic pigment.

The synthetic latices of the present invention have a cationic or anionic charge. The charge is imparted to the latex during manufacture of the latex using procedures well known to those skilled in the art, for instance by employing cationic or anionic monomers in the manufacture of the latex, or using cationic or anionic emulsifiers or surfactants in the manufacture of the latex.

A water soluble binder is defined as a solution binder or polymeric material which has a particle size greater than 50 nanometers but smaller than that of the latex particle. Examples of solution binders are natural binder materials such as starch and soya protein. Polyvinyl alcohol also can be a solution binder.

Natural binder material such as starch and soya protein can also exist in swollen form having a particle size greater than 0.5 micron. Heating of the binder materials is discontinued before solubilization takes place. The particles are insoluble in an aqueous medium.

A non-dispersed inorganic pigment particle is one which, in an aqueous medium, is essentially neutral or slightly negatively or positively charged, specifically, one which has a zeta potential in the range of +5 to $-10$ mv.

The use of pigments in paper coatings, and as fillers in paper substrates, or in paints, inks rubber and plastics is well known. In these applications, the pigments are used to provide optical properties such as gloss, brightness, opacity, and color. In the case of coated papers, the traditional function of pigments in the coatings is to fill in irregularities of the paper surface and provide an even and uniformly absorbent surface for printing. Most of the pigmented coatings employed for the coating of paper contain inorganic pigment as the primary ingredient. It is also well known to use a polymeric plastic pigment in the pigmented coatings.

In the present invention, the pigment particle is a layered composite particle. The layered composite particle comprises a first pigment particle and a second pigment particle. 10 Preferably, the layered composite particle of the present invention comprises a core pigment particle and multiple co-pigment particles electrostatically bound to the core pigment particle. Whether a particle is a core pigment particle or a co-pigment particle depends upon several factors. A principal factor is the manner in which dispersions of the pigment particles are mixed. Other factors are charge concentration on a particle, particle size, and weight proportions of ingredients used. If a first pigment particle dispersion is added incrementally to a second pigment particle dispersion, multiple particles from the second pigment particle dispersion can electrostatically be attracted to a single pigment particle from the first pigment particle dispersion, depending upon relative charge concentrations and volume of the respective particles. The first pigment particle from the first pigment particle dispersion thus becomes a core pigment particle, and the multiple pigment particles from the second pigment particle dispersion thus become co-pigment particles. Normally, the layered composite pigment of the present invention comprises, on a weight basis, 1–35% by weight core pigment particles, and 65–99% by weight copigment particles.

In the following description, one of the pigment particles is described as a first pigment particle. The other of the pigment particles is described as a second pigment particle. It will be apparent to those skilled in the art that the first pigment particle can be either a core pigment particle or a co-pigment particle, and the second pigment particle can also be either a co-pigment particle or a core pigment particle.

The first pigment particle of the layered composite particle of the present invention is an inorganic pigment particle which has an average particle size greater than about 0.1 micron. This is the particle size as it exists in suspension or dispersion prior to formation of the layered composite particle of the present invention. The particle size is critical for optical properties. Below about 0.1 micron, the particle is ineffective in improving opacity. An average particle size of at least about one-half the wavelength of visible light (0.2–0.3 micron) is necessary to obtain optimum light scatter.

The inorganic pigment particle can be any of the inorganic pigment particles conventionally employed in the above applications, which are capable of being slurried or dispersed in a fluid medium. Typical inorganic pigment particles are various grades of clay, such as kaolin clay and calcined clay, zinc oxide, talc, lithopone, satin white, aluminum trihydrate, silica, calcium carbonate, calcium sulfate, calcium silicate, barium sulfate, titanium dioxide, and mixtures thereof. Other examples of suitable inorganic pigment particles will be apparent to those skilled in the art.

The first pigment particle of the present invention can also comprise more than one type of particle. For instance, the first pigment particle can comprise a blend of kaolin clay and titanium dioxide, or kaolin clay and calcium carbonate. Other combinations of particles, as the first pigment particle, will be apparent to those skilled in the art.

The first pigment particle of the present invention has an anionic or cationic charge imparted to it. Imparting a charge to the particle is accomplished, in one embodiment, by the adsorption of a polyelectrolyte dispersant onto the surface of the particle. The dispersant can be either anionic or cationic. A solution or dispersion of the desired polyelectrolyte dispersant is first prepared. The pigment particle is then added, with mixing, to the solution or dispersion. Some pigments, such as talc, may require prior wetting, with a wetting agent, before adding the pigment particle to the solution or dispersion.

In making the pigment particle dispersion, an aqueous medium usually is employed. The polyelectrolyte dispersants are those that ionize in the medium. The dispersants are also those that form, on ionization, large anions or cations that are strongly adsorbed onto the surface of the pigment. As a result of this adsorption, the particle receives an electrostatic charge similar to the charge of the adsorbed polymeric ions. The polymeric ions are localized at the surface of the particles. The magnitude of the charge on the particle depends upon the extent of adsorption of polymeric ions as well as the number of charged units in each molecule.

The pigment particles in an aqueous medium are stabilized by the adsorbed dispersant ions. The adsorbed ions establish a layer of counter-ions of opposite charge around each particle. The counter-ions are those ions left in the dispersion following ionization of the polymers and particle ion adsorption. The layer of counter-ions do not attach themselves to adsorbed ions due to the factors that cause the polymers to ionize in the first place. When one particle approaches another, as though to flocculate, the diffuse layer of counter-ions on one particle begins to merge with the diffuse layer of counter-ions on the other particle. Since the two layers of counter-ions are similarly charged, the layers repel each other, thus maintaining the particles in a dispersed, stable condition in the dispersion. No homoflocculation of the particles occurs.

The polyelectrolyte dispersants of the present invention are generally of low molecular weight, in the range of about 2,000 to about 100,000, but sufficiently high in molecular weight to adhere to the particles by Van der Waals or electrostatic forces.

Examples of polyelectrolyte dispersants capable of forming large polyanions, when ionized, are well known. A preferred such polyelectrolyte dispersant is a water soluble vinyl polymer, an alkali metal or ammonium salt thereof, or an alkali metal or ammonium salt of polysilicic acid. Specific examples are poly (acrylic) acids, poly (methacrylic) acids, a substituted poly (acrylic) acid, a substituted poly (methacrylic) acid, or an alkali metal or ammonium salt of any of these acids. One commercially available anionic dispersing agent is sodium polyacrylate.

It is also possible to purchase pigment particles having an anionic polymeric dispersant adsorbed on the surface of the particles. One such pigment particle is kaolin clay marketed by the Engelhard Corporation under the trademark "ULTRAWHITE 90". The "ULTRAWHITE 90" kaolin clay is available as a 70% by weight aqueous suspension of clay dispersed with sodium polyacrylate. Another anionic pigment particle which is commercially available is titanium dioxide marketed by E. I. Dupont de Nemours under the trademark "RPS". The titanium dioxide is normally dispersed in water using a blend of sodium polyacrylate and an alkanol amine as the dispersing agent.

Examples of suitable cationic polymeric dispersants useful in the present invention are disclosed in U.S. Pat. No. 5,006,574. One useful water-soluble cationic polymeric material is a diallyl quaternary ammonium polymer salt. This cationic polymer is characterized by a high density of positive charges. Preferably, the polymer does not have negative groups such as carboxyl or carbonyl groups.

U.S. Pat. No. 5,006,574 also discloses other quaternary ammonium cationic polymers obtained by copolymerizing an aliphatic secondary amine with epichlorohydrine. Still other water-soluble cationic polyelectrolytes are poly (quaternary ammonium) polyester salts that contain quaternary nitrogen in a polymeric backbone and are chain extended by the groups. They are prepared from water-soluble poly (-quaternary ammonium salts) containing pendant hydroxyl groups and bifunctionally reactive chain extending agents. Such polyelectrolytes are prepared by treating $N,N,N^{(1)}$, $N^{(1)}$tetraalkylhydroxyalkylene diamine and an organic dihalide such as dihaloalkane or dihaloether with an epoxy haloalkane. Other water soluble cationic polyelectrolytes are polyamines.

U.S. Pat. No. 5,006,574 is specifically directed to the preparation of a stable aqueous slurry of positively charged particles of calcined kaolin clay.

U.S. Pat. No. 4,874,466 also discloses the adsorption of a cationic water-soluble polymer onto titanium dioxide, from an aqueous dispersion. The polymer comprises at least 50 weight percent of repeating units consisting of a quaternary ammonium salt moiety and 2–10 carbon atoms, wherein the carbons form alkyl or aryl moieties, or combinations of alkyl and aryl moieties which are substituted with hydroxy, amine or halide and polyaluminum chloride and mixtures thereof.

The disclosures of U.S. Pat. Nos. 5,006,574 and 4,874,466 are incorporated herein.

Cationic polyelectrolyte dispersing agents are also commercially available, for instance, a cationic oligomer marketed by Calgon Corp. under the trademark "CALGON 261". Another is one marketed by Nalco Chemical Co. under the trademark "NALCO 7607".

The amount of ionic polymeric dispersant employed is usually a small amount, in the range of about 0.01–2.5 weight percent (dry) based on the weight of the pigment. A preferred level of addition is about 0.05–0.5 w/w percent based on pigment.

The first pigment particle, in another embodiment of the present invention, can also be an inorganic pigment particle which is dispersed with a cationic water soluble polymeric binder material which has dispersant functionality. The binder material has to be cationic.

In this embodiment of the present invention, where the dispersant is a cationic water soluble binder, the inorganic pigment particle in its undispersed form should be generally neutral or slightly anionic or cationic in charge, having a zeta potential in the range of about +5 to negative, e.g. −10 mv. When combined with the cationic water soluble or water insoluble binder material, in an aqueous medium, the binder material adsorbs onto the surface of the inorganic particle, and imparts to the inorganic particle a zeta potential in the range of about +5 mv to about +100 mv.

The zeta potential is determined by the amount of binder material adsorbed. Preferably, the amount adsorbed is in the range of about 0.1–20%, preferably about 0.5–10%, more preferably about 1–5%, dry weight basis, based on pigment dry weight.

The dispersing capability of the cationic polymeric binders is the same as that of the polyelectrolyte dispersants described above. The cationic binders, in an aqueous medium, ionize, and form, on ionization, large cations that are strongly adsorbed onto the surface of the pigment. The molecular weight of the dispersant binders is preferably in the range of 2,000 to 2,000,000, more preferably in the range of 10,000 to 1,000,000, preferable above 50,000. As a result of this adsorption, the particle receives an electrostatic charge equal to the charge of the adsorbed ions.

The adsorbed ions establish a layer of counter-ions of opposite charge around each particle. The counter-ions are those ions left in the dispersion following ionization of the binder particles and particle ion adsorption. The layer of counter-ions do not attach themselves to adsorbed ions due to the factors that cause the binders to ionize in the first place. When one particle approaches another, as though to flocculate, the diffuse layer of counter-ions on one particle begins to merge with the diffuse layer of counter-ions on the other particle. Since the two layers of counter-ions are similarly charged, the layers repel each other, thus maintaining the particles in a dispersed, stable condition.

The solubilized cationic binders, by virtue of their binder functionality, and ability to disperse, can be characterized as dual functional binder/dispersing agents.

Examples of suitable water soluble binder materials are a cationic starch, cationic polyvinyl alcohol, and a cationic protein. The cationic water soluble binder materials have a particle size greater than 50 nanometers, preferably, greater than 0.01 micron.

One example of a suitable water-soluble cationic binder material that is commercially available is a cationic starch marketed by Penford Products, Inc. under the trademark "APPOLO 4280".

The cationic dispersant can also be a water insoluble, synthetic, cationic latex. The cationic synthetic lattices are homopolymers, copolymers, terpolymers and multipolymers of monomers, such as acrylic and acrylate monomers, styrene, butadiene, vinyl acetate, divinyl benzene, and other latent or active cationic unsaturated monomers. By "latent", it is meant one that will develop a positive charge through reaction on the latex surface, such as through quaternization or pH change. The cationic latices can also be made cationic by the use of cationic surfactants, either as emulsifiers during polymerization, or as post-stabilizers. It is also known to prepare such latices by using cationic emulsifiers or surfactants in the polymerization process, or by using amines as either emulsifiers or copolymers, in the polymerization, which become cationic at an acidic pH.

One example of a cationic synthetic latex which has dispersant functionality, is a cationic styrene butadiene copolymer having an average particle size in the range of 0.01 to 2 microns, preferably about 0.05 to 1 micron. One commercially available cationic synthetic latex found to have dispersant functionality, and also binder functionality, is an acrylonitrile acrylic ester copolymer marketed by BASF Corporation under the trademark "BASOPLAST 250D". The latex binder may also be a hollow latex such as disclosed in U.S. Pat. 4,973,670, or a core shell latex. Another cationic binder latex which can be used is one marketed by Reichold Chemical Co. under the trademark "VONCOAT", either "VONCOAT SFC54" or "VONCOAT SFC55".

It is understood that if only dispersant functionality is desired, the latex can be one not having binder functionality.

The cationic synthetic latices function as dispersants in the same manner as the cationic water soluble binder materials. Namely, when dispersed in water, they ionize and form large cations which adsorb onto the surface of the undispersed inorganic particles. The particles must have a zeta potential in the range of +0.5 to negative, e.g., −10 mv. This adsorption establishes a layer of counter-ions which resists particle-to-particle flocculation. As with the cationic water soluble binder materials, the amount of latex absorbed is in the range of 0.1–20%, preferably 1–5%, dry weight basis.

The second pigment particle in the layered composite pigment particle of the present invention can be a synthetic latex particle such as a plastic pigment particle, or a latex binder particle, which has an anionic or cationic charge opposite the charge of the first pigment particle. The second pigment latex particle has a particle size in the range of 0.01 to 2 microns up to 1 micron preferably greater than about 0.05 micron and is water insoluble.

The particular particle size of the second pigment particle depends upon the properties desired. If opacity is desired, a lower limit of 0.1 micron is preferred. If binder functionality is desired, a lower limit of 0.01 micron is preferred.

The synthetic latex particle, as the second pigment particle, can be any of the water insoluble synthetic latex particles, either binder or plastic pigment, employed to disperse an inorganic particle, in connection with the first pigment particle. The difference is that the synthetic latex particle, in this instance, is reacted with a particle of opposite charge to make a layered composite particle. In connection with the first pigment particle, it was reacted with a neutral or slightly positive inorganic particle to disperse the inorganic particle, which was then reacted with a particle of opposite charge to make a layered composite particle.

To disperse an inorganic pigment particle, the synthetic latex particle has to be cationic. To react with a particle of opposite charge, for making a layered composite particle, the synthetic latex particle can be anionic or cationic.

Thus, the synthetic latex particle, as the second particle, can be a cationic particle reacted with an anionically dispersed first inorganic pigment particle. The synthetic latex particle can also be an anionic particle reacted with a cationically dispersed first inorganic pigment particle.

Examples of suitable organic polymeric synthetic latex particles that can function as second pigment particles are plastic pigments, polymeric latex binders, plastic hollow sphere pigments, polystyrene pigments. Some of these particles have been used traditionally to reduce the weight of a coating by substitution for inorganic pigments, or to improve printability and optical properties. Pigments of this type are generally described in U.S. Pat. Nos. 3,779,800; 3,853,579; 3,949,138; and 3,931,061.

The second pigment particle can also be an anionic or cationic swollen natural binder material, such as soya bean protein, casein or starch. These materials are not normally considered to be pigments, because in normal usage they are heated in the presence of water or alkali until they are solubilized. Starch granules, at room temperature, are relatively insoluble. On heating, the starch granules first swell. If heating is discontinued, no substantial dissolution of the starch granules occur. The same is true for casein and soya bean protein, but in these instances, alkali is used with heat. Without heat, and preferrably with limited alkali, just swelling takes place.

At the transition point where these granules are swollen but not solubilized, the granules have a definite shape and an average particle size above 0.05 microns, preferably above 0.1 micron. Thus, they are useful as second pigment particles in the present invention.

Those skilled in the art will recognize that natural and synthetic solution binder materials such as a solubilized cationic starch, or a synthetic polymer in solution, cannot be a second pigment particle in accordance with the present invention, because they are both water soluble and less than 0.01 micron in size.

It is understood that the requirement of 0.05 micron average diameter, with regard to swellable particles, particularly binder materials, refers to the diameter after swelling.

The second pigment particle in the layered composite pigment particle of the present invention can also be an inorganic particle which is dispersed with an anionic polyelectrolyte dispersant.

In making a layered composite particle, the first particle can be an inorganic particle dispersed with either a cationic or an anionic dispersant. However, where the dispersant is a water soluble binder material or a latex, the dispersant has to be cationic. To distinguish from copending application Ser. No. 834,468, U.S. Pat. No. 5,344,487 the second pigment particle, when an inorganic pigment particle, has to be layered with a first pigment particle which is dispersed with a water soluble binder material or a latex. Thus, the dispersant for the second pigment particle, where the second pigment particle comprises an inorganic particle, has to be anionic.

Examples of suitable anionic polyelectrolyte dispersants, useful for the second inorganic pigment particle, are those disclosed with respect to the first inorganic pigment particle.

The second pigment particle of the present invention can comprise any of the inorganic pigment particles listed above as suitable first pigment particles, having the requisite particle size and capable of being slurried or dispersed in a fluid medium; e.g., clay, zinc oxide, talc, lithopone, satin white, aluminum trihydrate, silica, calcium carbonate, calcium sulfate, calcium silicate, barium sulfate, titanium dioxide, and mixtures thereof. As with the first pigment particle, the second pigment particle can comprise more than one type of particle, for instance, a blend of pigment particles.

One purpose of the second pigment particle may be to impart certain functional characteristics to a particle dispersion. By way of example, the second pigment particle may be a co-pigment particle chosen to enhance the performance of a core particle, by means of the optical properties of the second pigment particle, such as refractive index, or by means of creating a bulked structure that contains air voids. Thus, the second inorganic pigment particle, in a particular particle dispersion, will normally, but not necessarily, be different from the first inorganic pigment particle.

In making the layered composite particle of the present invention, the first and second pigment particle dispersions are separately formed. That is, the first pigment particle dispersion is formed, for instance an inorganic pigment dispersed with an anionic polyelectrolyte dispersant, and the second pigment particle dispersion is separately formed, for instance with a cationic latex.

Once the two particle dispersions are made, they are then combined, by adding one to the other. Preferably, the addition of one to the other is carried out slowly with shear mixing. This prevents the first and second particles from bonding in the form of large aggregates.

Whether a particle is a co-particle or a core particle depends, as indicated above, upon the order and manner of addition, charge concentration on the particle, and proportions of ingredients. Generally, the particle in the receiving particle dispersion become co-particles in the layered composite particles of the present invention, and the particles from the giving particle dispersion become the core particles.

The layered composite particles of the present invention are useful in a paper substrate, as well as a coating. The electrostatic bonds, formed by the polymeric dispersants, are sufficient to keep the layered composite particles intact, even in the presence of conventional shear forces experienced in paper making or coating processes, or in formulation and use processes conventionally associated with plastics, rubbers, paints and ink. Additionally, the strong attachment of binder to pigment provides the mechanism to resist binder migration during drying.

The following Examples illustrate the present invention.

In the following Examples, the viscosity data was obtained using a Brookfield Viscometer. Mixing was performed using a "Premier Dispersator".

EXAMPLE 1

This Example illustrates the preparation of a composite pigment in accordance with the teachings of copending application Ser. No. 834,468, U.S. Pat. No. 5,344,487 and advantages of the same.

Step A: A 60% solids cationic dispersion of titanium dioxide was prepared by adding 240 grams of titanium dioxide, marketed by E. I. DuPont de Nemours & Co. under the trade designation "RPD2", to 160 grams of water. This titanium dioxide is a dry non-dispersed material. The water contained 0.67 grams of a cationic polymeric dispersant (polyelectrolyte) marketed by Nalco Chemical Co. under the trade designation "7655". The dispersion was mixed for ten minutes at 1,000 rpm in a Premier Dispersator. A viscosity at 60 rpm of about 200 mps was obtained.

This dispersion was then diluted to 25.8% solids by adding 218 grams of water to 165 grams of the 60% solids dispersion. The cationic titanium dioxide dispersion weighed 383 grams.

Step B: A 76.7% solids anionic dispersion of calcium carbonate was prepared by adding 266 grams of dry calcium carbonate, marketed by OMYA, Inc. under the trademark "HYDROCARB 90" to 80 grams of water. The calcium carbonate contained a sodium polyacrylate (anionic) dispersant, making the dispersion of calcium carbonate anionic. The dispersion weighed 346 grams.

Step C: The above 25.8% solids cationic titanium dioxide dispersion (383 grams) was added to 346 grams of the anionic "HYDROCARB 90" dispersion, over about 30 minutes, with mixing, in the Premier Dispersator, at 2,400 rpm. This provided a layered composite pigment in which the titanium dioxide was the core pigment, and the calcium carbonate was the co-pigment. The resulting dispersion had a Brookfield viscosity at 20 rpm of 1,430 mps, and at 100 rpm of 200 mps. The layered composite pigment dispersion had a solids content of 55.3%.

The higher viscosity of the layered composite pigment dispersion, despite a lower solids content, indicates the layered composite nature of the pigment particles in the dispersion. The mixing of the titanium dioxide dispersion with the calcium carbonate dispersion took place essentially without homoflocculation.

EXAMPLE 2

This Example illustrates the preparation of a dispersion of an inorganic pigment using a water soluble binder having dispersant functionality in addition to binder functionality.
Step A: A simple slurry of neutral titanium dioxide in water was prepared, as follows:

| | |
|---|---|
| Dry titanium dioxide "RPD2" (DuPont) | 110 grams |
| Water | 90 grams |
| Mixing | 2,300 rpm for 3–5 minutes |
| Solids | 55% |

Step B: The titanium dioxide of Step A was mixed with a cationic starch binder, as follows:

| | |
|---|---|
| Titanium dioxide of Step A | 96.8% dry weight basis |
| Cationic starch binder "APPOLO 4280", marketed by Penford Products, Inc. | 3.2% dry weight basis based on TiO$_2$, added to the slurry of Step A from a 25.2% solids solution |
| Mixing | 1,000 rpm |
| Viscosity, 12 rpm | 6,150 mps |
| Viscosity, 60 rpm | 1,720 mps |

This provided a cationic dispersion of titanium dioxide having a solids content of about 52.8%.

Control Step: The simple slurry of Step A was diluted with water to 52.8% solids and gave the following viscosity data:

| | |
|---|---|
| Viscosity at 12 rpm | 10,500 mps |
| Viscosity at 60 rpm | 3,540 mps |

In step B, the cationic binder starch adsorbed onto the surface of the titanium dioxide particles.

The significant reduction in viscosity, compared to the control step, by the addition of the cationic starch, even without taking into effect the viscosifying effect of the starch, indicated the dispersing functionality of the starch.

The cationic starch is a conventional cationic water soluble binder material in cationic coatings and paper substrates.

As a further control, a blend of anionically dispersed titanium dioxide and 3.2% Penford Gum 280 starch, a neutral version of "APPOLO 4280", was prepared at 52% solids. This mixture gave a Brookfield viscosity at 12 rpm of 6,500 mps and at 60 rpm 1,800 mps indicating that the viscosity of the titanium dioxide dispersed with cationic starch is in large part due to the starch itself.

EXAMPLE 3

This Example illustrates the preparation of a dispersion of an inorganic pigment using a cationic latex binder having dispersant functionality in addition to binder functionality.

Step A: A simple slurry of neutral titanium dioxide ("RPD2") in water was prepared following essentially the same procedure as in Step A of Example 2, except that the slurry had a slightly lower solids concentration. The slurry provided the following data:

| | |
|---|---|
| Solids concentration | 54.6% |
| Viscosity, 12 rpm | 18,500 mps |
| Viscosity, 60 rpm | 5,850 mps |

Step B: A cationic acrylonitrile acrylic ester copolymer latex dispersion was added to the slurry of Step A, as follows:

| | |
|---|---|
| Slurry of Step A | 200.99 grams |
| "BASOPLAST 250D", trademark BASF Corporation, cationic latex, 35% solids | 7 grams (0.36% dry weight basis based on titanium dioxide) |
| Mixing | Latex added incrementally to the slurry of Step A until minimum viscosity obtained, at 2,000 rpm |
| Percent solids after mixing | 54.6 |
| pH after mixing | 7.36 |
| Viscosity, 12 rpm | 500 mps |
| Viscosity, 60 rpm | 140 mps |

The major drop in viscosity illustrates the excellent dispersing functionality of a cationic latex for the titanium dioxide. The cationic latex is a known binder material in cationic paper coating and substrate formulations, and thus, in this Example, served the dual function of dispersing as well as providing binder functionality.

EXAMPLE 4

A layered composite pigment according to the present invention, comprising calcium carbonate dispersed with an anionic polyelectrolyte dispersant, and titanium dioxide, dispersed with the cationic latex of Example 3, was prepared, as follows:

Step A: An anionically dispersed calcium carbonate dispersion "HYDROCARB 90", marketed by OMYA, Inc., was prepared as in Step B of Example 1. The calcium carbonate had the following solids content:
Calcium carbonate anionic dispersion, solids content 70.88%

Step B: The cationic titanium dioxide dispersion of Example 3 (dispersed with a cationic latex) was added to the anionic calcium carbonate dispersion of Step A. The titanium dioxide dispersion was incrementally added to the calcium carbonate dispersion with mixing at 1,000 rpm over a three minute period. The resulting slurry was then mixed for two minutes at 2,000 rpm using a Premier Dispersator.

| | |
|---|---|
| Cationic titanium dioxide dispersion of Example 3 | 28.6 grams |
| Anionic calcium carbonate | 200 grams |

-continued

| dispersion of Step A Parts ratio dry weight basis | |
|---|---|
| Calcium carbonate | 90 |
| Titanium dioxide | 10 |
| Solids after mixing | 68% |
| Viscosity, 12 rpm | 3,700 mps |
| Viscosity, 60 rpm | 1,032 mps |

As a control, a 68.1% solids blend of an anionically dispersed titanium dioxide and the anionically dispersed calcium carbonate ("HYDROCARB 90") in the same parts ratio, dry weight basis, gave a viscosity at 12 rpm of 590 mps, and at 60 rpm, of 295 mps. The higher viscosity of the layered composite pigment of the present invention indicates the effect of structuring the pigment.

By adding the titanium dioxide to the calcium carbonate, the titanium dioxide became a core pigment particle and the calcium carbonate became a co-pigment particle in the resulting layered composite pigment.

EXAMPLE 5

This Example illustrates the preparation of a layered composite pigment in accordance with the present invention, in which the core pigment particle is titanium dioxide, dispersed with a cationic starch, and the co-pigment particle is kaolin clay, dispersed with an anionic polyelectrolyte dispersant.

Step A: An anionic dispersion of kaolin clay was prepared by mixing a No. 2 dry, neutral, coating clay ("ULTRA-COTE", Englehard Corporation) with a sodium polyacrylate (anionic) dispersant, at 2% by weight (dry basis), in water at 2,000 rpm for ten minutes.

| Kaolin clay dispersion "ULTRACOTE" (Englehard) | 70.1% solids |
|---|---|

Step B: The cationic titanium dioxide dispersion of Step B of Example 2 (dispersed with a cationic starch binder, "APPOLO 4280", Penford Products, Inc., at a level of about 3.2 weight percent, dry weight basis, providing a dispersion having a solids content of about 52.8%) was diluted with water, as follows:

| Cationic titanium dioxide dispersion of Example 2 | 75.8 grams |
|---|---|
| Water | 141.4 grams |
| Solids | 17% |

Step C: The dispersion of Step B was added to the dispersion of Step A, over a period of 22 minutes, with mixing at 2,000 rpm. This provided the following data:

| Cationic titanium dioxide dispersion of Step B | 217.2 grams |
|---|---|
| Anionic kaolin clay dispersion of Step A Parts dry weight basis | 514 grams |
| Clay | 90 |
| Titanium dioxide | 10 |

| Solids | 61.9% |
|---|---|
| Viscosity, 12 rpm | 5,000 mps |
| Viscosity, 60 rpm | 1,310 mps |

This produced a dispersion of a layered composite pigment in which the core particle was titanium dioxide and the co-particle was kaolin clay.

The above dispersion was then further dispersed, by the addition of 0.173% sodium polyacrylate dispersant marketed by Allied Colloids, Limited, under the trademark "DISPEX N40", reducing the viscosity at 12 rpm, to 2,550 mps, and at 60 rpm, to 770 mps.

EXAMPLE 6

This Example illustrates the efficacy of the layered composite pigment of the present invention. The layered composite pigment of Example 5, prepared in accordance with the present invention, was compared against two control pigment compositions. All three pigment compositions comprised the same ingredients in essentially the same weight proportions, namely about 10% titanium dioxide, about 90% kaolin clay, and about 3.2% starch based on titanium dioxide solids. The pigment compositions were tested for optical brightness and opacity.

Control A: In this control, a suspension was prepared by mixing 10 grams of titanium dioxide which was anionically dispersed, 90 grams of kaolin clay, which was also anionically dispersed, and 3.2 weight percent of a neutral starch (Penford gum "280"), based on the weight of the titanium dioxide. The control was prepared at 60% solids.

Control B: A preblend dispersion of titanium dioxide and kaolin clay was prepared, as follows:

| Titanium dioxide ("RPD2") 70% solids | 55.3 grams (38.6 grams dry weight basis) dispersed in water with 0.3% by weight (dry weight basis) of an anionic sodium polyacrylate dispersant "DISPEX N 40") |
|---|---|
| Kaolin clay ("ULTRACOTE") 70% solids | 514 grams (359 grams dry weight basis), dispersed in water at 70% solids dispersed with an anionic sodium polyacrylate dispersant |
| Ratio of kaolin clay to titanium dioxide | 90/10 |

The same cationic starch as used in Example 5 ("APPOLO 4280", Penford Products, Inc., was added to the above preblend, as follows:

| Preblend dispersion | 569.3 grams |
|---|---|
| Cationic starch ("APPOLO 4280") | 1.28 grams dissolved in 101.6 grams of water (about 3.2% based on the dry weight of the titanium dioxide and clay) |
| Mixing | 2,000 rpm |
| Solids | 59.8% |
| Viscosity, 12 rpm | 1,400 mps |
| Viscosity, 60 rpm | 390 mps |

The layered composite pigment dispersion of Example 5 had a viscosity at 12 rpm of 2,500 mps and at 60 rpm of 1,770 mps. It can be seen that the Control B and the layered composite pigment dispersion of Example 5 had somewhat similar viscosities.

Step D: The layered composite pigment slurry of Example 5, the slurry of Control A, and slurry of Control B were coated onto two different rawstocks of low brightness, at the same coat weight, and the coated raw stocks were then measured for improved brightness. The following measurements were obtained:

| Raw Stock Brightness | Control A | Control B | Layered Composite Pigment of Example 5 |
|---|---|---|---|
| 70.9 | 80.4 | 81.7 | 82.7 |
| 72.8 | 82 | 82.2 | 83.3 |

The above results indicate a significant improvement in brightness and opacity using the layered composite pigment of the present invention.

EXAMPLES 7 and 8

These Examples illustrate the use of a cationic latex as a core pigment and an anionically dispersed inorganic particle as a co-pigment, in accordance with the present invention.

Step A: For Example 7, a first dispersion of a cationic latex ("VONCOAT SFC54") was obtained, and for Example 8, a second dispersion of a cationic latex ("VONCOAT SFC55") was also obtained. The following is relevant data concerning the first and second dispersions.

| Property | Example 7 ("VONCOAT SFC54", Reichold Chemical Co.) | Example 8 ("VONCOAT SFC55", Reichold Chemical Co.) |
|---|---|---|
| Polymer Type | Acrylic | Acrylic |
| % solids | 40 | 40 |
| Viscosity, CPS (25° C.) | less than 500 | less than 500 |
| pH | 3.5–5.5 | 3.5–5.5 |
| Particle size, microns | 0.2–0.3 | 0.2–0.3 |
| Particle charge | Cationic | Cationic |
| MFT, °C. | 20 | 0 |
| Description | Rigid | Soft |

Step B: A dispersion of an anionic kaolin clay was prepared, as follows:

| Neutral Kaolin clay, 70% solids ("ULTRACOTE", Englehard) | 259 grams |
| Water | 19.3 grams |
| Anionic sodium polyacrylate dispersant ("DISPEX N40", Allied Colloids, Limited) | 0.25 weight %, dry weight basis |

The kaolin clay was anionically charged by adsorption, on its surface, of 0.25 weight percent "DISPEX N40", in 19.3 grams of water.

Step C: The cationic latices of step A were added to samples of the anionic clay dispersion of Step B, over a period of ten minutes, at 1,000 rpm, using a "Premier" mixer.

| Data | Example 7 | Example 8 |
|---|---|---|
| Cationic latex binder | 9.5 grams at 40% solids | 18.2 grams at 40% solids |
| Kaolin clay dispersion | 259 grams at 70.3% solids | 259 grams at 70.3% solids |
| Solids after mixing | 64.6% | 59.3% |
| % latex based on clay | 2% | 4% |
| Viscosity at 60 rpm | 468 mps | 1,760 mps |
| Settling | None after 1 week | None after 1 week |

In the above Examples, the cationic latices became the core particles, in the layered composite pigment, and the anionic clay particles became the co-particles.

From the above description of the invention, those skilled in the art will perceive improvements, changes and modifications. Such improvements, changes and modifications within the skill of the art are intended to be covered by the appended claims.

Having described the invention, the following is claimed:

1. A layered composite pigment particle comprising:
   (a) a first pigment particle having a charge of one sign;
   (b) a second pigment particle having a charge opposite in sign to the charge of said first pigment particle;
   (c) the first and second pigment particles being electrostatically bound to each other;
   (d) said first pigment particle being an inorganic pigment particle having adsorbed on its surface a dispersing amount of an organic polymeric dispersant selected from the group consisting of:
      (i) a polyelectrolyte dispersant which is cationic or anionic;
      (ii) a cationic synthetic latex having dispersant functionality;
      (iii) a cationic water soluble natural binder having dispersant functionality;
   (e) said second pigment particle being selected from the group consisting of:
      (i) a synthetic latex particle which is anionic or cationic or swollen binder particle which is anionic or cationic, said swollen binder particles having a particle size greater than 0.05 micron;
      (ii) an inorganic pigment particle having adsorbed on its surface a dispersing amount of an anionic polyelectrolyte dispersant wherein the second inorganic pigment particle is layered with a first inorganic particle dispersed with a dispersant selected from the group consisting of (d)(ii) or (d)(iii).

2. The layered composite pigment particle of claim 1 wherein said second pigment particle is a cationic synthetic latex made from:
   (a) cationic monomers;
   (b) cationic emulsifiers or surfactants; or
   (c) amines as emulsifiers or as copolymers which become cationic at acidic pH.

3. The layered composite pigment particle of claim 2 wherein said second pigment particle latex is a plastic pigment.

4. The layered composite pigment particle of claim 2 wherein said second pigment particle latex has binder functionality.

5. The layered composite pigment particle of claim 2 wherein said first pigment particle is an inorganic pigment particle having adsorbed on its surface an anionic polyelectrolyte dispersant, and wherein said first pigment particle is a core pigment particle present in the layered composite pigment particle in the range of about 1–35% based on the weight of the layered composite pigment particle and the second pigment particle is a co-pigment particle present in the layered pigment particle in the range of about 65–99%

6. The layered composite pigment particle of claim 1 wherein said second pigment particle is a swollen binder material having a particle size greater than about 0.1 micron.

7. The layered composite pigment particle of claim 6 wherein said swollen binder particle is a swollen starch.

8. A layered composite pigment particle according to claim 1 wherein said first pigment particle comprises:
   (a) an undispersed inorganic pigment particle having a zeta potential in the range of +5 to negative;
   (b) a cationic synthetic latex or cationic water soluble organic binder material adsorbed onto the surface of the inorganic pigment particle in a dispersing amount and providing said inorganic pigment particle with a zeta potential in the range of +5 to +100 my.

9. The layered composite pigment particle of claim 8 wherein said first pigment particle comprises a dispersing amount of a latex having a $T_g$ in the range of –20° to 110° C.

10. A layered composite pigment particle of claim 8 wherein said first pigment particle comprises a dispersing amount of a cationic starch.

11. A layered composite pigment particle according to claim 8 wherein said first pigment particle comprises a dispersing amount of a cationic polyvinyl alcohol.

12. A layered composite pigment particle according to claim 8 wherein said first pigment particle comprises a dispersing amount of a cationic protein.

13. A layered composite pigment particle according to claim 8 wherein said second pigment particle is an inorganic pigment particle having adsorbed on its surface an anionic polyelectrolyte dispersant.

14. A water dispersion comprising the layered composite pigment particle of claim 1.

15. A water dispersion comprising the layered composite pigment particle of claim 5.

16. A water dispersion comprising the layered composite pigment particle of claim 8.

17. A paper coating composition comprising the layered composite pigment particle of claim 1.

18. A paper coating composition comprising the layered composite pigment particle of claim 5.

19. A paper coating composition comprising the layered composite pigment particle of claim 8.

20. A pigment particle comprising:
   (a) an undispersed inorganic pigment particle having a zeta potential in the range of +5 to negative;
   (b) a dispersing amount of a cationic synthetic latex having a $T_g$ in the range of –20 to 110° C. adsorbed onto the surface of the inorganic pigment particle imparting to the inorganic pigment particle a zeta potential in the range of +5 to +100 mv.

21. A layered composite pigment comprising the pigment particle of claim 20.

22. The layered composite pigment of claim 1, wherein
   (a) the organic polymeric dispersant adsorbed on the first pigment particle is cationic
   (b) the organic polymeric dispersant adsorbed on the second pigment particles is anionic.

23. A dispersion comprising the pigment particle of claim 20.

24. A coating composition comprising the pigment particle of claim 20.

25. A paper composition comprising the pigment particle of claim 20.

26. A method of making a layered composite pigment particle comprising the steps of:
   (a) preparing a first pigment particle aqueous dispersion comprising an inorganic pigment particle dispersed with (i) a polyelectrolyte dispersant which is cationic or anionic, (ii) a cationic synthetic latex having dispersant functionality, or (iii) a cationic water soluble binder having dispersant functionality;
   (b) preparing a second pigment particle aqueous dispersion comprising (i) a synthetic latex which is anionic or cationic or a swollen binder particle which is anionic or cationic and said swollen binder particles has a particle size greater than 0.05 micron, or (ii) an inorganic pigment particle having absorbed on its surface a dispersing amount of an anionic polyelectrolyte dispersant; and
   (c) mixing the dispersions of steps (a) and (b), in one of the following combinations: (b)(i) with (a)(i), (a)(ii) or (a)(iii); (b)(ii) with only (a)(ii) or (a)(iii).

27. The method of claim 26 wherein one of the first or second dispersions is added to the other of the first or second dispersions and a particle from the giving dispersion becomes a core particle and a particle from the receiving dispersion becomes a co-particle.

28. The method of claim 27 wherein step (c) comprises adding 1–35% by weight giving dispersion to 65–99% by weight receiving dispersion.

29. A layered composite pigment particle prepared by the method of claim 26.

* * * * *